Figure 1:
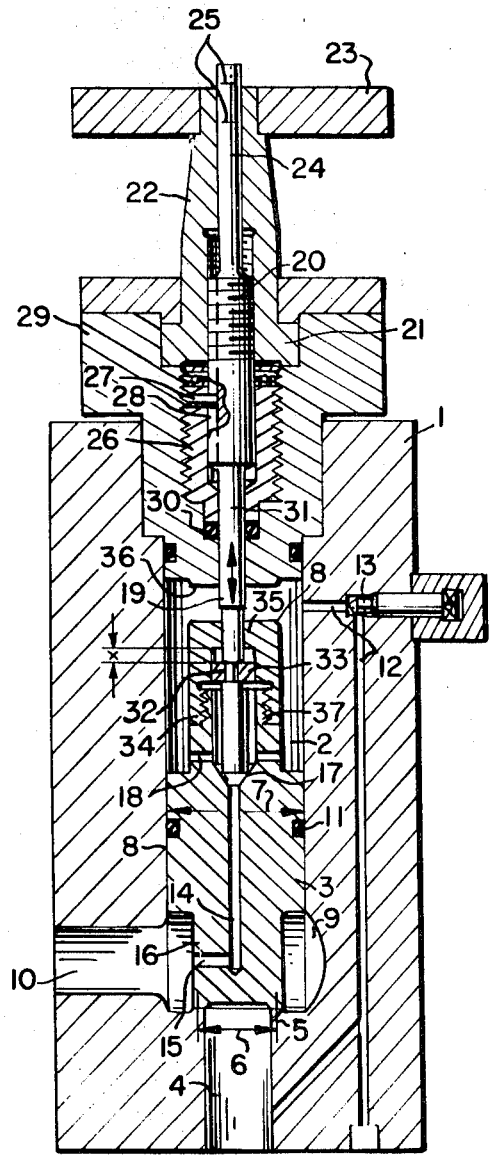

United States Patent

[11] 3,612,476

[72] Inventor Anton Leitgeb
 Aesch, Switzerland
[21] Appl. No. 826,829
[22] Filed May 22, 1969
[45] Patented Oct. 12, 1971
[73] Assignee Maschinenfabrik Burckhardt AG
 Basel, Switzerland
[32] Priority May 23, 1968
[33] Switzerland
[31] 7620/68

[54] APPARATUS FOR ACTUATING CLOSURE ORGANS FOR HIGH PRESSURES
 1 Claim, 2 Drawing Figs.
[52] U.S. Cl. ................................................. 251/38,
 251/43
[51] Int. Cl. ................................................. F16k 31/383
[50] Field of Search ........................................... 251/38, 43;
 137/630.14, 603.15

[56] References Cited
UNITED STATES PATENTS

| | | | |
|---|---|---|---|
| 247,789 | 10/1881 | White............................ | 251/38 |
| 2,020,833 | 11/1935 | Hansen......................... | 251/38 X |
| 2,169,044 | 8/1939 | Goehring...................... | 251/38 |
| 2,795,391 | 6/1957 | Krone et al. .................. | 251/43X |

FOREIGN PATENTS

| | | | |
|---|---|---|---|
| 783,133 | 1935 | France ......................... | 251/43 |
| 1,094,061 | 1960 | Germany...................... | 251/38 |
| 348,374 | 1960 | Switzerland.................. | 251/38 |

Primary Examiner—Arnold Rosenthal
Attorney—Kurt Kelman

ABSTRACT: A piston moves within a bore in a valve housing to open and close an inlet and outlet port. One face of the piston is directly responsive to the pressure of a working fluid while the other face thereof is simultaneously responsive to the working fluid received through a diverting duct. A spindle is directly connected to the piston to move the same. The piston is provided with a fluid relief duct operable by the movement of the spindle to create a pressure differential on the faces of the piston to enhance movement.

3,612,476

INVENTOR.
ANTON LEITGEB

BY

AGENT

APPARATUS FOR ACTUATING CLOSURE ORGANS FOR HIGH PRESSURES

The present invention relates to fluid valves, and particularly to apparatus for actuating closure pistons in stop an shutoff valves for high pressures. Provision is made for automatically applying pressure, through the fluid medium employed, to a valve closure piston, to provide a sealing force which is proportional to the differences in diameter of the valve closure and of the valve seating.

Conventional high pressure stop or shutoff valves, comprise closure parts which are adapted to be actuated through the operation of threaded spindles. Because of the friction engendered in the spindle threading it is necessary to apply considerable force to effect the desired closure. The degree of force required varies with the particular flow cross section of the valve seating in each particular instance, and may be so high that additional drive devices are required to increase the speed and force of the spindle.

The present invention eliminates this drawback by permitting the valve closure organ or piston to execute axial sliding movements for the purpose of opening and closing the valve to the flow of the fluid medium. The effective sealing surface of the axially movable valve closure organ, i.e. a pressure-actuated piston, is selectively exposed to, or relieved of, the pressure of the fluid medium. Control thus of the valve closure organ is applied by way of a feed duct which is selectively opened to the region above the valve closure organ.

Figure 2:
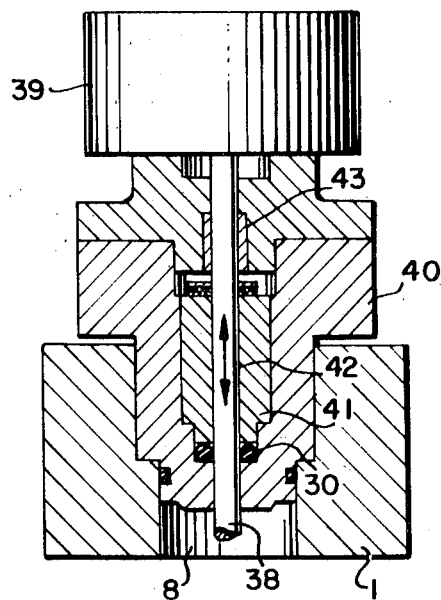

An embodiment of the subject matter proposed according to the present invention is illustrated in the appended drawing, in which:

FIG. 1 shows the arrangement of the closure organ for a stop or shutoff valve which is actuated by means of a hand wheel, FIG. 2 shows the arrangement of the closure organ in which actuation takes place by means of an automatic lifting device.

In the arrangement which is illustrated in FIG. 1 a tapered valve closure member, which is constituted as a pressure-actuatable piston 3, is longitudinally movably inserted in an axially extending bore 2 which forms part of a valve housing 1 an includes a valve seating 5. The sealing or closure diameter 6, which is required for causing opening or closing of the inlet bore 4 at the valve seating 5, is smaller than the diameter 7 of the valve chamber 8 in the housing bore 2 which serves to receive the piston so that—when the valve is closed and when the same pressure is present both above and below the piston—the force effective on the surface constituted by the diameter 7 is greater than the force which is produced by the pressure acting in the region of the sealing (closure) diameter 6; and the force which is required to produce a fluidtight seal at the vale seating 5 is proportional to the surfaces presented by the diameters 6 and 7.

The piston 3 seals the chamber 8 from a space 9, which is relieved of pressure and which comprises a fluid discharge opening 10. A suitable sealing ring whose construction is known per se is arranged in the piston 3. Pressurized fluid medium is fed into the pressure space or chamber 8 from the fluid inlet opening 4 by way of one or more ducts 12 which lies outside the bore 2 and also by way of a fluid flow restricting device 13 whose effective through-flow cross-sectional area can be securely adjusted from the outside. The piston 3 defines an axially extending discharge duct 14, which opens out into the space or chamber 8 and which enables communication to be established, by way of a laterally directed duct 15, with the discharge opening 10. In order to ensure that the lateral duct 15 will be in continuous communication with the space or chamber 9, even during the period when the piston 3 is in the course of its opening stroke or path of motion, the lateral bore 15 is located in the lower zone 16 of the piston 3. This lower zone 16 has a smaller diameter in comparison with the diameter 7 of the bore 2. The discharge duct 14, which opens out into the space or chamber 8 by way of lateral ducts 18, is champhered in a region 17 to form a closure (sealing) seating which is selectively closed by means of a longitudinally movably spindle 19 whose lower end conforms to seating 17. To actuate the spindle 19 in a longitudinally directed movement, i.e. for opening and closing the discharge duct 14, spindle 19 includes an enlarged portion 20 which is provided with screw threading and which is screwed into a flanged bushing 21 which is capable of rotational movement but incapable of longitudinal movement and which is equipped with an appropriate, internal threading. The threaded bushing 21 may be turned by means of a hand wheel 23 or by means of some other suitable device, which is rigidly attached to its stem 22. In order to ensure that the spindle 19 will execute the required longitudinal or lengthwise movement on rotation of the handle, it is provided with threaded bushing 26 which is firmly screwed into position in a surrounding casing 29. The bushing 26 is provided at is upper end with a guide pin or tab 27 which projects into the central bore of the casing 29 and which engages in a groove 28 extending lengthwise in the threaded portion 20 parallel to the axis of the spindle 19. As a result of the longitudinal lotion which is brought about by this particular arrangement, any possible wear—which might occur, as in the case of conventional rotatable spindles, in the closure zone 17 and during the opening and closure actions of the vavle—will be reduced to a substantial extent.

The space or chamber 8 is closed at its upper end with respect to the outside by means of a sealing ring element 30 which is of a known form of construction and which is of a inserted in the casing 29, so that the cross-sectional area of the downwardly extending spindle part 31 determines the magnitude of the force exerted, while the spindle is being actuated.

In order to ensure that the piston 3 may be maintained in its uppermost position—so as to prevent undesired movement and vibration from occurring while it is thus in its opened position, particularly as a result of pulsations in the fluid medium, an abutment ring 33 (which may be formed in two semicircular washers) is inserted in a groove or neck 32 formed in the lower end of the spindle 19. Surrounding the ring and spindle is sleeve 34, which is equipped with an abutment flange 35 and with inner threading. The sleeve 34 is securely screwed on to the upper portion 37, of the piston 3. In this manner the abutment ring 33 can be moved, together with the spindle 19 through a distance indicated as x between the abutment flange 35 and the upper piston edge 37, within the cooperating portion of the bore of sleeve 34 which acts as a guide. The upwardly directed, axial and longitudinal movement of the spindle 19, which occurs when the hand wheel 23 is turned, continues until the upper end surface of the sleeve 34 comes into abutting contact with the lower, cooperating abutment surface 36 of the closure part 29. The piston 3 is carried along and is maintained in its opened position afterward as a result of the abutting contact of the two-part abutment ring 33 on the inner flange 35. The lower closure portion of the spindle 19 meanwhile moves through the distance x from the sealing point or area 17 so that, in the upper position of the piston 3, continuous communication is maintained between he pressure chamber (space) 8 and the discharge bore 10 by way of ducts 18, 14 and 15. It is possible to ascertain the position of the piston 3 by providing the spindle 19 with a stem 24 having graduated markings 25 passing through the bore of the shaft 22 of the flanged bushing 21.

FIG. 2 illustrates an arrangement which is similar in its basic essentials to the form of construction which is illustrated in FIG. 1. Here, however, the longitudinal movement defines the spindle 38 is not actuated mechanically by turning a hand wheel, but is brought about lifting means of a lifting device 39, which is actuated magnetically, pneumatically or hydraulically and which, for example, is in the form of a diaphragm mechanism. These devices enable valves of this kind to be remotely actuated and controlled.

In the arrangement illustrated in FIG. 2, a threaded solid cylinder 41, which lies in a casing 40 serves as a housing for the sealing element 30, and defines a smooth, through bore 42 in which spindle 38 is longitudinally displaceable. Above the casing 40 the lifting device is provided—according to the particular form of construction adopted in each individual instance—with a guide bushing 43 which enables the axial movements of the spindle to be controlled and guided with the required accuracy. The remaining structure of the valve, similar to that shown in FIG. 1, is omitted from FIG. 2.

When the closure valve is in the blocked or closed condition, the longitudinally movable, piston 3 lies in tight sealing contact with the seat 5, the discharge duct 14 being closed off in the upper closure zone 17 by means of the spindle 19 which has been pushed into its downwards position. The force which is necessary to maintain the piston 3 in blocked or closed condition is exerted by means of the fluid pressure medium which acts, in chamber or space 8, on the upper end surface of the piston 3. The diameter of the upper surface, indicated in the drawing as 7, is larger than the lower surface of the piston 3 which is defined by the diameter 6, so that a sealing or closure force, which is proportional to the pressure exercised by the working, fluid medium, will be produced and will depend on the difference in the effective surface areas accessible to the working, fluid medium. The fluid medium which normally has same pressure in space or chamber 8 as in the fluid inlet opening 4—this fluid medium being fed by way of the bores 12 and adjustable restricting device 13—is unable to discharge into the pressure relieving discharge space or chamber 9 owing to the fact that the discharge duct 14 is closed off by the spindle 19 and due to the presence of the sealing element 11. The piston 3 is consequently maintained in its closing or sealing position during this time because the spindle 19 is subject to greater pressure present in space or chamber 8, created specifically by the effective difference in the diameters presented by the spindle 19 and by the sealing or closure area 17.

In order to open the piston 3 the spindle 19 is moved axially upwardly either by turning the hand wheel, as shown in FIG. 1, or by actuating the lifting device 39, which is shown in FIG. 2. As a result of the upwards, axial movement of spindle 19 the discharge bore 14 in the closure (sealing) zone 17 opens and communication is established with space 9 and thus with the discharge opening 10. During this opening action the fluid medium which is contained under pressure in space 8 discharges into the pressure-free discharge space or chamber 9. The piston 3 is lifted by the force acting on the surface of the valve seating 5, constituted by diameter 6, as the pressure very rapidly drops on the opposite or upper, end face in chamber 8 as a result of discharges of the fluid medium, and refilling of this space 8 with the fluid medium from the inlet opening 4 takes place more slowly—under the effect of the appropriately adjusted fluid flow cross section in the flow restricting device 13—than discharge of the pressure-relieved fluid medium through the discharge bores 14 and 15. In the course of its longitudinal movement spindle 19 automatically carries with it the piston 3 through the intermediary of the two-part ring 33 which acts as an entraining means and is longitudinally movably disposed in the corresponding portion of the bore of the threaded sleeve 34. When the upper, end face of the sleeve 34 comes into abutting contact with the end surface 36 of the upper casing 29, the piston 3 is maintained in its upper position through contact of the abutment flange 35 and the abutment ring 33. The front closure part of the spindle 19 remains at a distance x from the inlet opening of the closure (sealing) zone 17 and, consequently, the free communication which is required for effecting pressure compensation is established between space or chamber 8 and the discharge space 9 by way of the discharge ducts 18 and 14. The piston 3 is held in its opened position, so that it will not be exposed, on the occurrence of vibrations or pulsations of the fluid medium, to any uncontrollable movements liable to disturb the smooth functioning of the valve.

In the course of the downwards movement of the spindle 19 over the distance x, the discharge duct 14 is closed off in the sealing (closure) zone 17 of the piston 3. However, since at commencement of the closure action the pressures in chambers 8 and 9 of the valve are equal, as a result of the fact that the piston 3 is still raised from the valve seating 5 the shifting of the piston 3, by means of the spindle 19 is very easy. However, at the instant of valve closure, the force necessary for achieving a fluidtight closure is fully applied are to the difference between diameters 6 and 7, as has already been explained above.

It is therefore only necessary to apply to the spindle 19 to apply a force to the spindle 19 which corresponds to the action of the fluid medium of the effective spindle cross section of the stem portion 31 determined by the sealing element 30. It is consequently seen that the fluid medium automatically acts to assist and effect the operation of the piston, both in its stroking phases and in its maintenance phases.

I claim:

1. In a high pressure fluid valve, the combination of a housing having an axial bore with an inlet port at one end of said bore and an outlet port communicating laterally with the bore, a closure on said housing at the other end of said bore, a piston slidable in the bore between a valve-closed position wherein it covers said inlet port and a valve-open position wherein it is spaced axially away from the inlet port and the latter communicates with the outlet port, a portion of said bore between said piston and said housing closure defining a chamber, a fluid inlet duct extending through said housing and communicating said inlet port with said chamber, said piston being provided with a fluid outlet duct communicating said chamber with said outlet port, a valve stem slidable axially in said chamber and in said housing closure, end of said stem being engageable with said piston to close said fluid outlet duct when the valve stem is slid in the direction of said inlet port, a casing secured to said piston in said chamber and having said valve stem extending slidably therethrough, said casing having an end wall spaced axially from the piston, a ring secured to the valve stem in said casing for and movable with he valve stem between a position wherein said end of the stem closes said outlet duct and a position wherein said ring abuts said end wall of said casing whereupon the piston and the casing are moved unitarily with the valve stem to the vavle-open position by movement of the stem in the direction of said housing closure, and actuating means for moving said stem, said actuating means comprising an actuating member rotatably mounted in said housing closure and projecting outwardly therefrom, said stem including means to prevent rotation and having a screw-threaded portion in engagement with a screw thread in said actuating member, the valve being further characterized in that said end wall of the casing on said piston abuttingly engages said housing closure when the valve is moved to the valve full open position.